X0003346 ar. 13
June 26. 1821 485

Ross Winans
Letters Patent

The Schedule referred to in these Letters Patent and making part of the same containing a description in the words of the said Ross Winans him self of his improvement in fulling Cloth by the use of Steam

---

It has hitherto been the custom to prepare cloth in soap for fulling by this process we are enabled to full cloth without the use of soap at all in a much shorter time and in much greater perfection as follows. 1st After the oil is taken out of the cloth the cloth is put into common stocks which are closed for the purpose of retaining the steam & is there placed in the usual mode. 2d The cloth is then wet with pure water and a small quantity of steam is introduced sufficient for heating it to a proper standard. The mill is then put in motion & the cloth is [illegible] handled as is customary. 3d By the above process the cloth becomes fulled or shrunk to a proper condition for dressing in one third of the usual time required by fulling with soap. It also becomes much finer & dresses to better advantage, besides it retains the entire colour of the Blue & all other colours that are dyed before fulling: Whereas by the old process considerable of the colour is lost. 4th In consequence of this mode the cloth works much easier in the Mill & requires less force to propel the Mill. 5th The inventor expects to procure his steam in the customary mode he however reserves to him self the right of improvement both in procuring & introducing it in this method of Fulling Cloth. and as other modes of heating may be introduced besides that of steam altho' perhaps with less convenience, the Inventor also would reserve to himself the right of preparing cloth for fulling by any process of heat whatever, except by the natural heat occasioned by the motion of the Mill. 6th The Inventor reserves to himself the right of using any materials which have heretofore been used in fulling in aid of his plan if the case require Witnesses. [illegible]
[illegible] Ross Winans